United States Patent
Yin et al.

(10) Patent No.: US 12,155,717 B2
(45) Date of Patent: Nov. 26, 2024

(54) ONLINE MULTI-WORKFLOW SCHEDULING METHOD BASED ON REINFORCEMENT LEARNING

(71) Applicant: Hangzhou Dianzi University, Hangzhou (CN)

(72) Inventors: Yuyu Yin, Hangzhou (CN); Binbin Huang, Hangzhou (CN); Zixin Huang, Hangzhou (CN)

(73) Assignee: Hangzhou Dianzi University, Hangzhou (CN)

( * ) Notice: Subject to any disclaimer, the term of this patent is extended or adjusted under 35 U.S.C. 154(b) by 0 days.

(21) Appl. No.: 18/355,420

(22) Filed: Jul. 20, 2023

(65) Prior Publication Data
US 2024/0137404 A1    Apr. 25, 2024

(30) Foreign Application Priority Data
Jul. 20, 2022    (CN) .......................... 202210857988.8

(51) Int. Cl.
*H04L 67/10*    (2022.01)
*G06F 9/48*    (2006.01)
*G06F 9/50*    (2006.01)

(52) U.S. Cl.
CPC ............ *H04L 67/10* (2013.01); *G06F 9/4881* (2013.01); *G06F 9/5038* (2013.01)

(58) Field of Classification Search
CPC ....... H04L 67/10; G06F 9/4881; G06F 9/5038
See application file for complete search history.

(56) References Cited

U.S. PATENT DOCUMENTS

| 11,206,221 | B1* | 12/2021 | Guo | ...................... H04L 47/527 |
| 2015/0074679 | A1* | 3/2015 | Fenoglio | ............. H04L 67/1008 718/104 |
| 2020/0364569 | A1* | 11/2020 | van Hasselt | ............. G06N 3/08 |
| 2021/0174246 | A1* | 6/2021 | Triplet | ..................... G06N 7/01 |

FOREIGN PATENT DOCUMENTS

| CN | 111756653 | A | * | 10/2020 | ........... G06N 3/0454 |
| CN | 112905312 | A | * | 6/2021 | |
| CN | 113778648 | A | * | 12/2021 | |

* cited by examiner

*Primary Examiner* — Oleg Survillo
*Assistant Examiner* — Monishwar Mohan
(74) *Attorney, Agent, or Firm* — DLA PIPER LLP (US)

(57) ABSTRACT

System model is established to characterize mobile devices, edge servers, tasks and nodes. Node unloading rule is established, and the mobile device can be selected to unload the nodes to the edge server or leave the nodes to be executed locally. Timeline model is established to record arrival events of all tasks and execution completion events of the nodes. Online multi-workflow scheduling policy based on reinforcement learning is established, state space and action space of scheduling problem are defined, and reward function of the scheduling problem is designed. Algorithm based on policy gradient is designed to solve online multi-workflow scheduling problem for implementing the scheduling policy. Unloading decision and resource allocation are performed based on features extracted by graph convolution neural network. Current workflow and state of the server can be analyzed in real time, thereby reducing complexity and average completion time of all workflows.

1 Claim, 4 Drawing Sheets

ONLINE MULTI-WORKFLOW SCHEDULING METHOD BASED ON REINFORCEMENT LEARNING

CROSS-REFERENCE TO RELATED APPLICATION

This patent application claims the benefit and priority of Chinese Patent Application No. 202210857988.8 filed with the China National Intellectual Property Administration on Jul. 20, 2022, the disclosure of which is incorporated by reference herein in its entirety as part of the present application.

TECHNICAL FIELD

The present disclosure belongs to the field of mobile edge computing, and mainly relates to an online multi-workflow scheduling method based on reinforcement learning.

BACKGROUND

Mobile Edge Computing (MEC) network deploys edge servers with certain computing capacity at the edge of the network, and provides higher quality of service by unloading computing tasks to the edge servers near the network edge of the local users. The network has obvious advantages such as low delay, strong security and reduced network congestion, which solves the problems of limited computing capacity and high delay in a conventional cloud computing mode. Effective and reasonable unloading decision and resource allocation will help to improve the performance of MEC network and bring considerable profits to enterprises.

However, the joint optimization problem of online unloading decision and resource allocation of workflow characterized by the Directed Acyclic Graph (DAG) in MEC network environment is a non-convex NP-hard problem. The conventional mathematical method to solve such problem has a large amount of calculation and high complexity, which brings a huge burden to MEC network. Therefore, there is also an attracted extensive attention of scholars at home and abroad to obtain better unloading decision and resource allocation in the mobile edge computing environment.

SUMMARY

In order to solve the above problems, the present disclosure proposes an online multi-workflow scheduling method based on reinforcement learning.

The method includes the following steps:

S1, establishing a system model:

a mobile edge computing network includes a plurality of mobile devices and a plurality of edge servers, a processor frequency and a number of processor cores of the mobile devices are respectively represented as $f_n$ and $cpu_n$, a processor frequency and a number of processor cores of the edge servers are respectively represented as $f_m$ and $cpu_m$, and a bandwidth between the edge servers and a bandwidth between the mobile devices and the edge servers are both represented as B; each mobile device generates independent tasks characterized by a DAG, and then each DAG is represented as a 2-tuple G=(V, E), where V=($v_1, \ldots, v_k, \ldots, v_K$) represents nodes in the DAG, and E={$e_{kl}|v_k \in V, v_l \in V$} represents an edge that characterizes a connection relationship between the nodes, and the edge $e_{kl}$ represents a constraint dependency relationship between the nodes, and the constraint dependency relationship indicates that the node $v_l$ starts execution only after the node $v_k$ completes execution; each node is characterized as a triple $v_k$=($W_k, D_k^i, D_k^o$), where $W_k$ represents a workload of the node $v_k$, $D_k^i$ represents an input data size of the node $v_k$, and $D_k^o$ represents an output data size of the node $v_k$; and both the mobile devices and the edge servers have their own waiting queues for storing the nodes to be executed on the mobile device or the edge server.

S2, establishing a node unloading rule:

the mobile device performs unloading in units of nodes, and selects to unload the nodes to the edge server or leave the nodes to be executed locally. A current node starts execution only after execution and data transmission of all predecessor nodes of the current node are completed. After a scheduling action is triggered, the scheduling policy proposed by the present disclosure selects a node to be allocated and determines the edge server or mobile device to which the node is to be allocated. The completion time of the node v k on the mobile device or the edge server is calculated by Formula (1):

$$FT_{v_k} = \max(pre_{v_k}, avail) + T_{exec}(v_k) \quad (1)$$

$$pre_{v_k} = \max_{v_l \in pre(v_k)}(FT_{v_l} + T_{tran}(v_l, v_k)) \quad (2)$$

$$T_{tran}(v_l, v_k) = \begin{cases} 0, & \text{nodes } v_l \text{ and } v_k \text{ are executed on the same edge server or mobile device} \\ \dfrac{D_l^o}{B}, & \text{nodes } v_l \text{ and } v_k \text{ are executed on different edge servers or mobile devices} \end{cases} \quad (3)$$

$$T_{exec}(v_k) = \begin{cases} \dfrac{W_k}{f_n * cpu_n}, & \text{the node } v_k \text{ is executed on the mobile device} \\ \dfrac{W_k}{f_m * cpu_m}, & \text{the node } v_k \text{ is executed on the edge server} \end{cases} \quad (4)$$

where in Formula (1), avail represents the available time of the mobile device or the edge server, max($pre_{v_k}$, avail) represents that a larger value of $pre_{v_k}$ and avail are taken; Formula (2) represents a time when execution and output data transmission of all the predecessor nodes of the current node $v_k$ are completed, where $FT_{v_l}$ represents a time when the node $v_l$ completes execution, and $\max_{v_l \in pre(v_k)}(FT_{v_l}+T_{tran}(v_l, v_k))$ represents a maximum value of a sum of $FT_{v_l}$ and $T_{tran}(v_l, v_k)$ for traversing all the predecessor nodes $v_l$ of the node $v_k$; Formula (3) represents time for data transmission, and if the predecessor node and the current node are executed on the same mobile device or edge server, data transmission is not required, otherwise, the data transmission is required, and Formula (4) represents time for the execution of the node.

S3, establishing a timeline model:

the present disclosure provides a timeline model, which records arrival events of all DAG tasks and execution completion events of the nodes. An arrival process of the task on the mobile device obeys Poisson distribution with a parameter λ, that is, a task arrival rate is λ. An event closest to a current time on the timeline is continuously captured, and the current time is updated according to the captured event until a condition for triggering the scheduling action is met. The condition for triggering the scheduling action is that there is a schedulable node and the edge server or the mobile device to which the schedulable node belongs is idle. After the scheduling action is completed, the events on the timeline continue to be captured.

S4, establishing an online multi-workflow scheduling policy based on reinforcement learning:

it is necessary to define a state space and action space of a scheduling problem, design a reward function of the scheduling problem, and use a gradient policy for training with a goal of maximizing the expected reward, which specifically includes the following substeps:

S41, defining the state space:

under the environment of online multi-workflow scheduling characterized by the DAG, an agent interacting with the environment uses a graph convolution neural network to extract the features of all DAGs. Each node aggregates information of its child nodes from top to bottom through the graph convolution neural network, while the child nodes as the parent nodes are also aggregated by their corresponding parent nodes. An embedding vector of each node can be obtained by step-by-step aggregation of the messages, and the embedding vector of each node includes information about a critical path value of each node. At the same time, based on the embedding vectors of these nodes, the agent further performs aggregation to obtain an embedding vector of the DAG to which the node belongs, which includes information about remaining workload of the DAG. Thereafter, based on the embedding vectors of these DAGs, the agent further performs aggregation to obtain a global embedding vector, which includes information about global workload.

An environmental state obtained by the agent observing the environment is divided into two parts:

when selecting the node to be scheduled, the environment state $O_{node}$ observed by the agent is expressed as Formula (5):

$$O_{node}=[E_{node}, E_{DAG}, E_{globa}, T_{stay}, T_{waste}, D_{i,o}, W_{node}, W_{pre}] \quad (5)$$

where $E_{node}$, $E_{DAG}$, and $E_{globa}$ represent the embedding vector of the node, the embedding vector of the DAG to which the node belongs, and the global embedding vector, respectively; $T_{stay}$ represents a staying time of the DAG to which the node belongs in the environment; $T_{waste}$ represents a duration that the node will wait for execution on the mobile device or the edge server and that the mobile device or the edge server will wait; $D_{i,o}$ represents input and output data of the node; and $W_{node}$ represents the workload of the node; $W_{pre}$ represents a sum of the workloads of all the parent nodes of the node.

when selecting a server to be allocated, the environment state $O_{server}$ observed by the agent is expressed as Formula (6):

$$O_{server}=[st_{pre}, st_{server}, T_{exec}, num_{child}, W_{child}] \quad (6)$$

where $st_{pre}$ represents a time when data transmission of predecessor nodes of the node is completed; $st_{server}$ represents an available time of each server; $T_{exec}$ represents an execution time of the node on each server; $num_{child}$ represents a total number of all child nodes and all descendant nodes of the node; and $W_{child}$ represents a sum of the workloads of all the child nodes and all the descendant nodes of the node;

S42, defining the action space:

the policy proposed by the present disclosure divides the action into two parts. The agent inputs the observed states $O_{node}$ and $O_{server}$ into two neural networks (i. e. a policy network) based on the gradient policy, respectively, so as to select the node node to be scheduled this time from the nodes to be scheduled and select the server server to be allocated to the node from the available servers, which is expressed by Formula (7):

$$A=[node, server] \quad (7)$$

where A represents the defined action space.

S43, defining the reward function:

in an online multi-workflow scheduling process, each action obtains an immediate reward to evaluate quality of the action, and an average completion time of all DAG tasks is taken as a final long-term optimization goal. According to Little's law, the immediate reward is set as an existence time of all DAG tasks in the environment during a period from the start of the current action to the trigger of the next action, which is expressed by Formula (8) and (9):

$$R=-\Sigma T_{stay}(G) \quad (8)$$

$$T_{stay}(G)=\min(T_{now}, T_{finish}(G))-\max(T_{pre}, T_{arrive}(G)) \quad (9)$$

where $T_{now}$ represents the current time; $T_{finish}(G)$ represents a completion time of a workflow G, $T_{pre}$ represents a time when a last action is executed, $T_{arrive}(G)$ represents an arrival time of the workflow G, min $(T_{now}, T_{finish}(G))$ represents a minimum value of $T_{now}$ and $T_{finish}(G)$; and $\max(T_{pre}, T_{arrive}(G))$ represents a maximum value of $T_{pre}$ and $T_{arrive}(G)$.

S44, formalizing the problem:

the online multi-workflow scheduling policy can take the neural network model based on the gradient policy into account, a main goal of which is to maximize a cumulative reward of all actions, which is expressed by Formula (10):

$$\text{Maximize: } \Sigma_{k=0}^{T} R_k \quad (10)$$

where T indicates T actions in implementation of the policy, k indicates a k-th action, and $R_k$ indicates a reward of the k-th action.

Because a goal of the gradient policy is to maximize the reward, gradient ascent is performed on neural network parameters to learn the parameters.

S5, implementing the policy:

The present disclosure designs a policy gradient-based algorithm for solving online multi-workflow scheduling problems (PG-OMWS) for implementing the policy, and the detailed process of implementing the policy is as follows:

(1) in the policy implementation stage, first, the environmental parameters and network parameters are initialized. The environmental parameters mainly include an execution queue length, the bandwidth between the mobile device and the edge server, and a DAG task structure in the environment and in an upcoming environment. The network parameters mainly include the network parameters in two policy networks and the graph convolution neural network. Then the agent observes basic features of each node in the environment, and feeds the basic features to the graph convolution neural network for two aggregations to obtain $E_{node}$, and then the aggregation is performed to obtain $E_{DAG}$ according to these $E_{node}$, and the aggregation is again performed to obtain $E_{globa}$ according to all $E_{DAG}$, to obtain $O_{node}$ and $O_{server}$ in conjunction with the current environment. The node to be allocated for the action and the server to be allocated to the node are selected. The completion events of the node are recorded in the timeline, and the reward of the action is calculated at the same time. The environmental state, the action and the reward observed every time will be saved. Subsequently, it is determined whether the condition for triggering the scheduling action is met, if the condition is met, the scheduling action continues to be triggered, and if the condition is not met, the event closest to the current time on the timeline is captured, and the current time is updated according to the event, until the condition for triggering the scheduling action is met again. A cycle of scheduling action and capturing timeline events is repeated continuously until all DAG tasks in the environment complete execution.

(2) in the training stage, according to the environment state, the action and the reward saved previously, the agent uses the gradient policy to update each network parameter by Formula (11) to obtain a final workflow scheduling policy:

$$\theta \leftarrow \theta + \alpha \Sigma_{k=0}^{T} \nabla_\theta \ln \pi_\theta(o_k, a_k) r_k \quad (11)$$

where $\theta$ represents the network parameter, a represents a learning rate, T represents T actions in the implementation of the policy, k represents the k-th action, $\pi_\theta(o_k, a_k)$ represents a probability that the neural network with $\theta$ as the parameter takes the action $a_k$ in the environmental state $o_k$, $r_k$ represents a comprehensive reward obtained by further attenuation based on the immediate reward, $\nabla_\theta \ln \pi_\theta(o_k, a_k) r_k$ represents a gradient of $\ln \pi_\theta(s_k, a_k) r_k$, and $\Sigma_{k=0}^{T} \nabla_\theta \ln \pi_\theta(o_k, a_k) r_k$ represents an accumulation of the gradients obtained from all actions;

(3) in the policy execution stage, when a workflow dynamically arrives in the environment, the edge server or the mobile device that executes the node in the workflow is selected by the final workflow scheduling policy as the server that executes the node to execute and complete the nodes in the workflows in sequence.

The method has the following beneficial effect. The graph convolution neural network is used to extract the structural feature of the workflow, and unloading decision and resource allocation are performed based on the extracted features. A solution combining the gradient policy is proposed for the first time under the online multi-workflow scheduling environment of mobile edge computing. When a workflow dynamically arrives in the environment, the present disclosure can analyze the current workflow and the state of the server in real time, and schedule the nodes of the workflow to a server for execution. This method has low complexity and reduces the average completion time of all workflows as much as possible.

DETAILED DESCRIPTION OF THE EMBODIMENTS

In order to make the purpose, technical scheme and advantages of the present disclosure more clear, the present disclosure will be further described in detail with the accompanying drawings.

Figure 1:
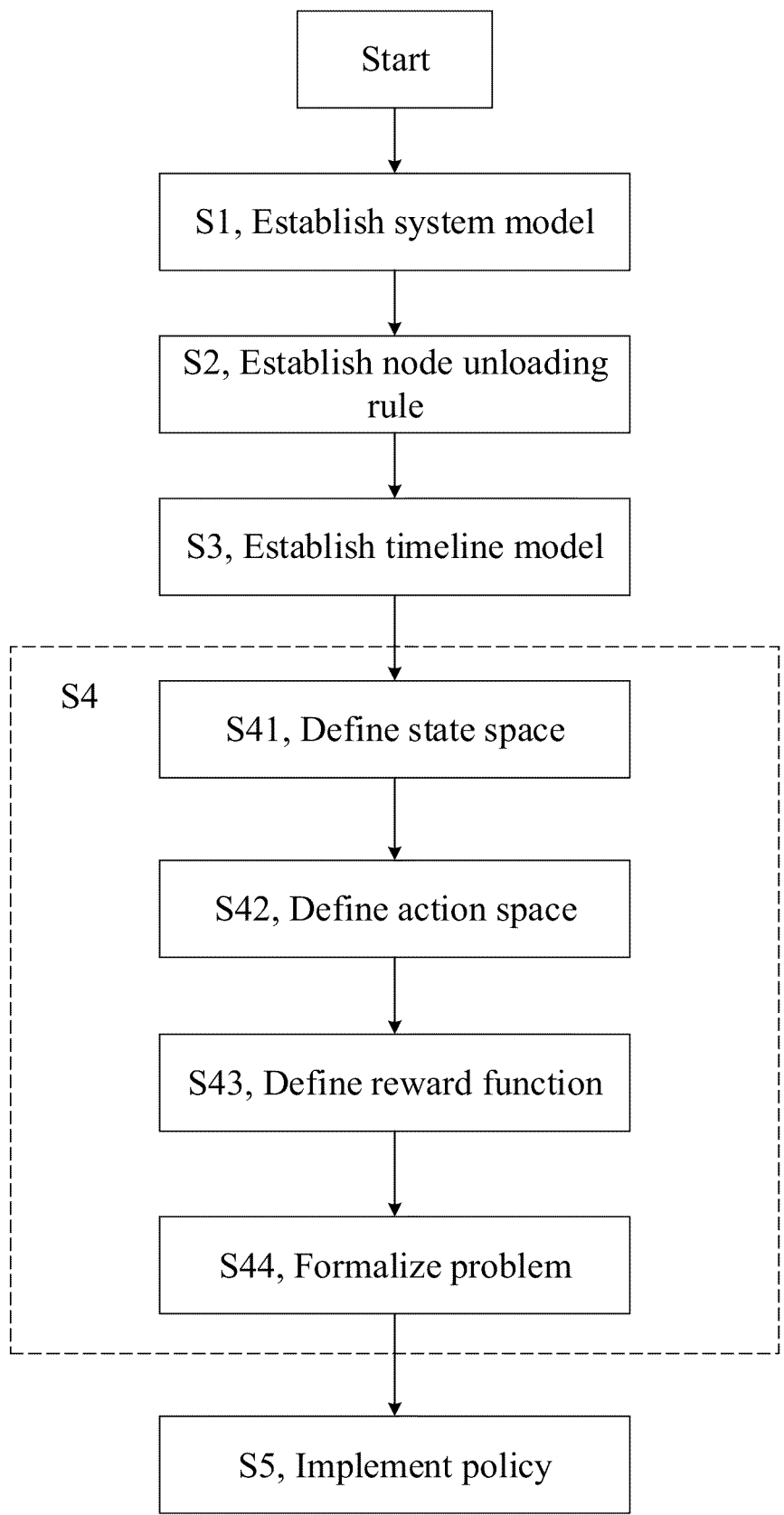
FIG. 1 is a flowchart of an online multi-workflow scheduling policy based on reinforcement learning according to the present disclosure.

As shown in FIG. 1, the present disclosure provides an online multi-workflow scheduling method based on reinforcement learning including the following steps:

S1, a system model is established:

A mobile edge computing network includes a plurality of mobile devices and a plurality of edge servers, the processor frequency and the number of processor cores of the mobile devices are respectively represented as $f_n$ and $cpu_n$, the processor frequency and the number of processor cores of the edge servers are respectively represented as $f_m$ and $cpu_m$, and the bandwidth between the edge servers and the bandwidth between the mobile devices and the edge servers are both represented as B;

each mobile device generates independent tasks characterized by a DAG, and then each DAG is represented as a 2-tuple G=(V, E), where V=($v_1$, ..., $v_k$, ..., $v_K$) represents nodes in the DAG, and E={$e_{kl}|v_k \in V, v_l \in V$} represents an edge that characterizes a connection relationship between the nodes, and the edge $e_{kl}$ represents a constraint dependency relationship between the nodes, that is, the node $v_l$ only starts execution after the node $v_k$ completes execution; each node is characterized as a triple $v_k$=($W_k$, $D_k^i$, $D_k^o$), where $W_k$ represents a workload of the node $v_k$, $D_k^i$ represents an input data size of the node $v_k$, and $D_k^o$ represents an output data size of the node $v_k$; and both the mobile devices and the edge servers have their own waiting queues for storing the nodes to be executed on the mobile device or the edge server.

S2, a node unloading rule is established:

The mobile device performs unloading in units of nodes, and selects to unload the nodes to the edge server or leave the nodes to be executed locally. The current node starts execution only after the execution and data transmission of all predecessor nodes of the current node are completed. After a scheduling action is triggered, the scheduling policy proposed by the present disclosure selects a node to be allocated and determines the edge server or mobile device to which the node is to be allocated. The completion time of the node $v_k$ on the mobile device or the edge server is calculated by Formula (1):

$$FT_{v_k} = \max(pre_{v_k}, avail) + T_{exec}(v_k) \quad (1)$$

$$pre_{v_k} = \max_{v_l \in pre(v_k)}(FT_{v_l} + T_{tran}(v_l, v_k)) \quad (2)$$

$$T_{tran}(v_l, v_k) = \begin{cases} 0, & \text{nodes } v_l \text{ and } v_k \text{ are executed} \\ & \text{on the same edge server or mobile device} \\ \dfrac{D_l^o}{B}, & \text{nodes } v_l \text{ and } v_k \text{ are executed} \\ & \text{on different edge servers or mobile devices} \end{cases} \quad (3)$$

$$T_{exec}(v_k) = \begin{cases} \dfrac{W_k}{f_n * cpu_n}, & \text{the node } v_k \text{ is executed on the mobile device} \\ \dfrac{W_k}{f_m * cpu_m}, & \text{the node } v_k \text{ is executed on the edge server} \end{cases} \quad (4)$$

wherein in Formula (1), avail represents the available time of the mobile device or the edge server; Formula (2) represents the time when the execution and output data transmission of all the predecessor nodes of the current node $v_k$ are completed; Formula (3) represents the time for data transmission., and if the predecessor node and the current node are executed on the same mobile device or edge server, data transmission is not required, otherwise, the data transmission is required; and Formula (4) represents the time for the execution of the node.

S3, a timeline model is established:

The present disclosure provides a timeline model, which records arrival events of all DAG tasks and execution completion events of the nodes. An arrival process of the task on the mobile device obeys Poisson distribution with a parameter λ, an event closest to the current time on the timeline is continuously captured, and the current time is updated according to the captured event until the condition for triggering the scheduling action is met. The condition for triggering the scheduling action is that there is a schedulable node and the edge server or the mobile device to which the schedulable node belongs is idle. After the scheduling action is completed, the events on the timeline continue to be captured.

S4, an online multi-workflow scheduling policy based on reinforcement learning: it is necessary to define a state space and action space of a scheduling problem, design a reward function of the scheduling problem, and use a gradient policy for training with a goal of maximizing the expected reward, which specifically includes the following sub-steps:

S41, the state space is defined:

Under the environment of online multi-workflow scheduling characterized by the DAG, an agent interacting with the environment uses the graph convolution neural network to extract the features of all DAGs. Each node aggregates information of its child nodes from top to bottom, and at the same time, the child nodes as the parent nodes are also aggregated by their own parent nodes. An embedding vector of each node can be obtained by step-by-step aggregation of the messages, and the embedding vector of each node includes information about a critical path value of each node. At the same time, based on the embedding vectors of these nodes, the agent further performs aggregation to obtain an embedding vector of the DAG to which the node belongs, which includes information about remaining workload of the DAG. Thereafter, based on the embedding vectors of these DAGs, the agent further performs aggregation to obtain a global embedding vector, which includes information about global workload. With the embedding vector of the node, the agent can determine the workload along the downward critical path of the node, and with the embedded vectors of the DAG and the global embedded vector, the agent can identify the relative size of the remaining workload of the operation.

An environmental state obtained by the agent observing the environment is divided into two parts:

when selecting the node to be scheduled, the environment state $O_{node}$ observed by the agent is expressed as Formula (5):

$$O_{node} = [E_{node}, E_{DAG}, E_{globa}, T_{stay}, T_{waste}, D_{i,o}, W_{node}, W_{pre}] \quad (5)$$

where $E_{node}$, $E_{DAG}$, and $E_{globa}$ represent the embedding vector of the node, the embedding vector of the DAG to which the node belongs, and the global embedding vector, respectively; $T_{stay}$ represents a staying time of the DAG to which the node belongs in the environment; $T_{waste}$ represents a duration that the node will wait for execution on the mobile device or the edge server and that the mobile device or the edge server will wait; $D_{i,o}$ represents input and output data of the node; and $W_{node}$ represents the workload of the node; $W_{pre}$ represents a sum of the workloads of all the parent nodes of the node.

when selecting the server to be allocated, the environment state $O_{server}$ observed by the agent is expressed as Formula (6):

$$O_{server} = [st_{pre}, st_{server}, T_{exec}, num_{child}, W_{child}] \quad (6)$$

where $st_{pre}$ represents the time when data transmission of predecessor nodes of the node is completed; $st_{server}$ represents the available time of each server; $T_{exec}$ represents the execution time of the node on each server; $num_{child}$ represents the total number of all child nodes and all descendant nodes of the node; $W_{child}$ represents a sum of the workloads of all the child nodes and all the descendant nodes of the node.

S42, the action space is defined:

The policy proposed by the present disclosure divides the action into two parts. The agent inputs the observed states $O_{node}$ and $O_{server}$ into two neural networks based on the gradient policy, respectively, so as to select the node node to be scheduled this time from the nodes to be scheduled and select the server server to be allocated to the node from the available servers, which is expressed by Formula (7):

$$A = [\text{node}, \text{server}] \quad (7)$$

where A represents the defined action space.

S43, the reward function is defined:

In the online multi-workflow scheduling process, each action obtains an immediate reward to evaluate the quality of the action, and the average completion time of all DAG tasks is taken as a final long-term optimization goal. According to Little's law, the immediate reward is set as the existence time of all DAG tasks in the environment during the period from the start of the current action to the trigger of the next action, which is expressed by Formula (8) and (9):

$$R = -\Sigma T_{stay}(G) \quad (8)$$

$$T_{stay}(G) = \min(T_{now}, T_{finish}(G)) - \max(T_{pre}, T_{arrive}(G)) \quad (9)$$

where $T_{now}$ represents the current time; $T_{finish}(G)$ represents a completion time of a workflow G, $T_{pre}$ represents a time when a last action is executed, $T_{arrive}(G)$ represents the arrival time of the workflow G, min $(T_{now}, T_{finish}(G))$ represents a minimum value of $T_{now}$ and $T_{finish}(G)$; and $\max(T_{pre}, T_{arrive}(G))$ represents a maximum value of $T_{pre}$ and $T_{arrive}(G)$. According to Little's law, because the arrival rate of tasks is determined by the outside world, the shorter the tasks stay in the environment, the less the average number of tasks in the environment, and the lower the average completion time of all tasks. Therefore, the immediate reward can evaluate the quality of the action better.

S44, the problem is formalized:

The online multi-workflow scheduling policy can take the neural network model based on the gradient policy into account, the main goal of which is to maximize a cumulative reward of all actions, which is expressed by Formula (10):

$$\text{Maximize: } \Sigma_{k=0}^{T} R_k \qquad (10)$$

where T indicates T actions in the implementation of the policy, k indicates the k-th action, and $R_k$ indicates the reward of the k-th action.

Because the goal of the gradient policy is to maximize the reward, gradient ascent is performed on neural network parameters to learn the parameters.

S5, the policy is implemented:

The present disclosure designs a policy gradient-based algorithm for solving online multi-workflow scheduling problems (PG-OMWS) for implementing the policy, and the detailed process of implementing the policy is as follows:

(1) in the policy implementation stage, first, the environmental parameters and network parameters are initialized. The environmental parameters mainly include an execution queue length, the bandwidth between the mobile device and the edge server, and a DAG task structure in the environment and in an upcoming environment. The network parameters mainly include the network parameters in two policy networks and the graph convolution neural network. Then the agent observes the basic features of each node in the environment, and feeds the basic features to the graph convolution neural network for two aggregations to obtain $E_{node}$, and then the aggregation is performed to obtain $E_{DAG}$ according to these $E_{node}$, and the aggregation is again performed to obtain $E_{globa}$ according to all $E_{DAG}$, to obtain $O_{node}$ and $O_{server}$ in conjunction with the current environment. The node to be allocated for this action and the server to be allocated to this node are selected. The completion events of the node are recorded in the timeline, and the reward of the action is calculated at the same time. The environmental state, the action and the reward observed every time will be saved. Subsequently, it is determined whether the condition for triggering the scheduling action is met, if the condition is met, the scheduling action continues to be triggered, and if not, the event closest to the current time on the timeline is captured, and the current time is updated according to the event, until the condition for triggering the scheduling action is met again. A cycle of scheduling action and capturing timeline events is repeated continuously until all DAG tasks in the environment complete execution.

(2) in the training stage, according to the environment state, the action and the reward saved previously, the agent uses the gradient policy to update each network parameter by Formula (11) to obtain a final workflow scheduling policy:

$$\theta \leftarrow \theta + \alpha \Sigma_{k=0}^{T} \nabla_\theta \ln \pi_\theta(o_k, a_k) r_k \qquad (11)$$

where $\theta$ represents the network parameter, $\alpha$ represents a learning rate, T represents T actions in the implementation of the policy, k represents the k-th action, $\pi_\theta(o_k, a_k)$ represents a probability that the neural network with $\theta$ as the parameter takes the action $a_k$ in the environmental state $o_k$, $r_k$ represents a comprehensive reward obtained by further attenuation based on the immediate reward, $\nabla_\theta \ln \pi_\theta(o_k, a_k) r_k$ represents a gradient of ln $\pi_\theta(s_k, a_k) r_k$, and $\Sigma_{k=0}^{T} \nabla_\theta \ln \pi_\theta(o_k, a_k) r_k$ represents an accumulation of the gradients obtained from all actions;

(3) in the policy execution stage, when a workflow dynamically arrives in the environment, the edge server or the mobile device that executes the node in the workflow is selected by the final workflow scheduling policy as the server that executes the node to execute and complete the nodes in the workflows in sequence.

Embodiment

The steps of this embodiment are the same as those of the specific implementation mentioned above, which are not described in detail here.

Preferably, the number of mobile devices in S1 is 3, the number of processor cores of the mobile devices is $cpu_n=4$, and the processor frequency of the mobile devices is $f_n=2.0$ GHZ. The number of edge servers is 6, the number of processor cores of the edge servers is $cpu_m=6$, and the processor frequency of the edge servers is $f_m=2.5$ GHZ. The bandwidth between the mobile device and the edge server, and the bandwidth between the edge server and another edge server are randomly selected between [10,100] MB/s. There are 10 DAG tasks in the environment initially, and then 15 DAG tasks are generated online by the mobile devices. The workload of nodes in the DAG is randomly selected between [10,100] GHZ·S. The output data of a node is set to 0.1 times the workload in units of MB, and the input data of the node is the sum of the output data of all its parent nodes.

Preferably, the Poisson distribution parameter in S2, i. e., the task arrival rate λ, is set to 5.

Preferably, the neural network hidden layer structures through which the graph convolution neural network in S5 aggregates are all the same, all of which have two hidden layers with 16 and 8 neurons respectively. The hidden layer structures of the two policy networks are also the same, both of which have three hidden layers with 32, 16 and 8 neurons respectively. In the present disclosure, an Adam optimizer is used to update the target network, the activation function uses leakyRelu, the learning rate is set to 0.0003, and the reward attenuation coefficient 7 is set to 1.

The implementation and implementation results of the comparison method are shown as follows.

In order to evaluate the effectiveness of the proposed method framework, five other methods (SJF, FIFO, Random, LocalEx, EdgeEx) are used for comparison. These five methods are briefly introduced hereinafter.

(1) SJF: This method selects the node to be executed according to the principle of short job priority, and takes the sum of the workloads of nodes in the DAG as the workload of the DAG. The less the workload, the earlier it is scheduled, and the edge server or mobile device with the earliest completion time to execute the node is selected as the server to execute the node.

(2) FIFO: This method selects the node to be executed according to the principle of first-in and first-out, and selects the edge server or the mobile device with the earliest completion time to execute the node as the server to execute the node.

(3) LocalEx: This method always selects the mobile device to execute the nodes, and the order of executing nodes follows the principle of first-in and first-out.

(4) EdgeEx: This abbreviation indicates that the node is always unloaded to the edge server. That is, except for the start node and the end node, this method always selects the edge server with the earliest completion time to execute the node, and the order of executing nodes follows the principle of first-in and first-out.

(5) Random: This method randomly selects the node and the edge server or the mobile device allocated at this time as the server executing the node.

The present disclosure evaluates and analyzes the influence of the task arrival rate, the number of processor cores of the edge servers, the number of processor cores of the mobile devices, the number of edge servers and the number of mobile devices on the average completion time of all tasks.

Figure 2:
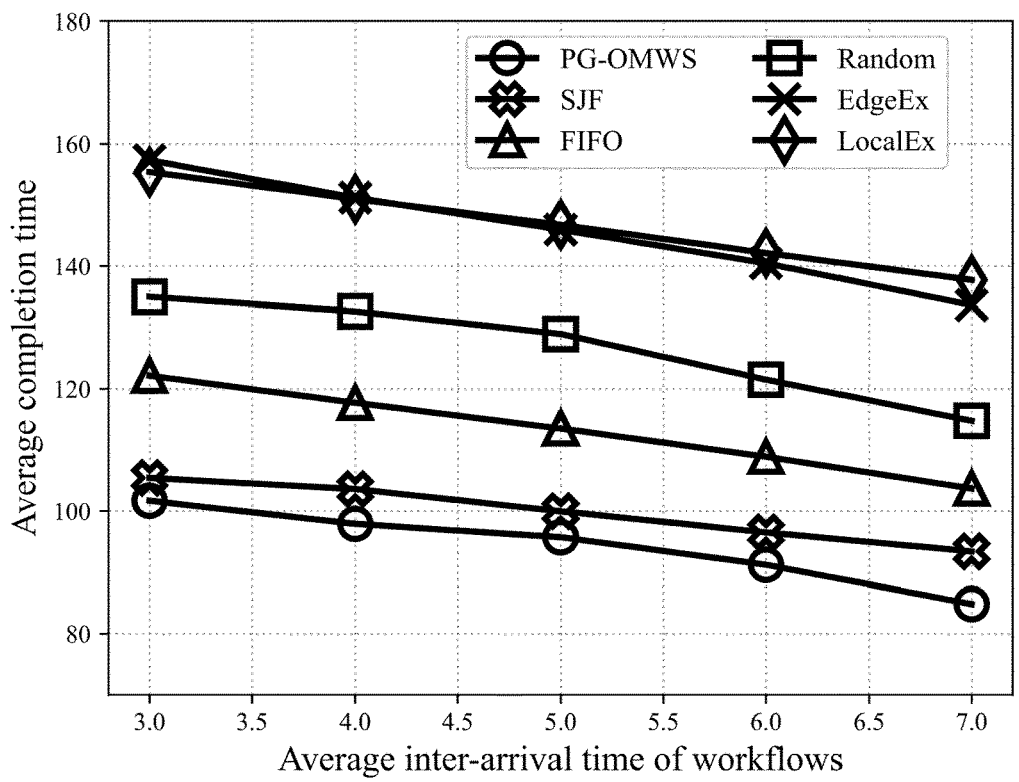
FIG. 2 is a comparison diagram of experimental results of the present disclosure with FIFO method, SJF method, Random method, LocalEx method and EdgeEx method under the influence of the task arrival rate $\lambda$.

In order to test the influence of different task inter-arrival times on performance, the task inter-arrival time is changed from 3 to 7 unit times in increments of 1. The average completion time obtained by the six methods is shown in FIG. 2. It is observed from FIG. 2 that compared with other methods, the method implemented by PG-OMWS according to the present disclosure has a lower average completion time, and the average completion time gradually decreases with the increase of task inter-arrival time. The reason is that with the increase of task inter-arrival time, the number of nodes that need to be processed at the same time decreases, thus reducing the average completion time.

Figure 3:
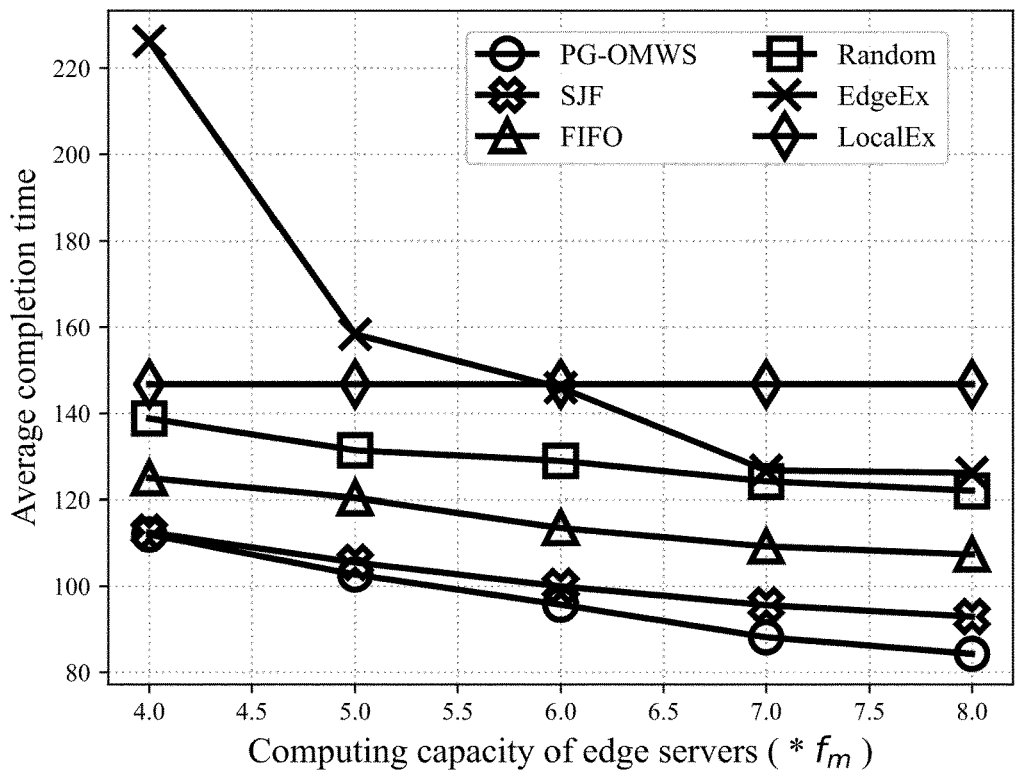
FIG. 3 is a comparison diagram of experimental results of the present disclosure with FIFO method, SJF method, Random method, LocalEx method and EdgeEx method under the influence of the number of processor cores of the edge server.

In order to study the influence of computing capacity of the edge server on performance, the number of processor cores of the edge server, i. e., the number of cores of the CPU, is changed from 4 to 8 in increments of 1. The average completion time obtained by the six methods in the experiment is shown in FIG. 3. It can be seen that the method implemented by PG-OMWS according to the present disclosure can obtain the lowest average completion time, and the average completion time gradually decreases with the increase of the number of cores of the CPU. The reason is that the increase of the number of cores of the CPU greatly shortens the processing delay of nodes, thus shortening the average completion time.

Figure 4:
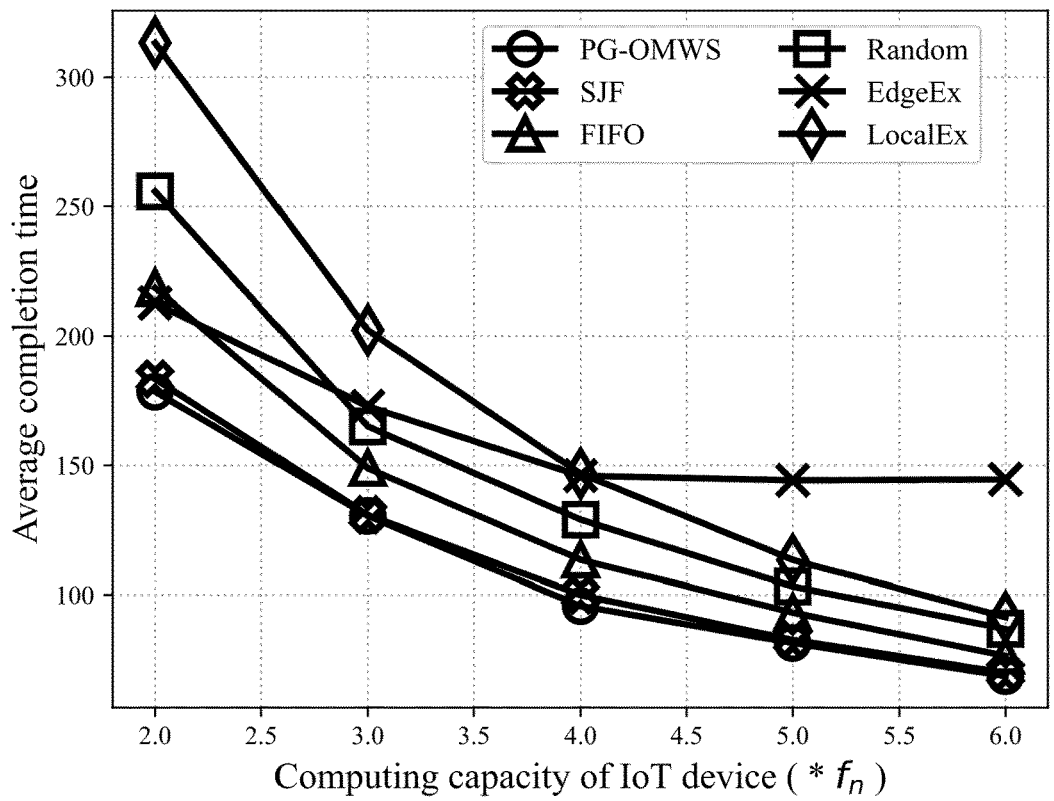
FIG. 4 is a comparison diagram of experimental results of the present disclosure with FIFO method, SJF method, Random method, LocalEx method and EdgeEx method under the influence of the number of processor cores of the mobile device.

In order to study the influence of computing capacity of the mobile devices, the number of cores of the CPU of the mobile devices is changed from 2 to 6 in increments of 1. The average completion time obtained by the six methods is shown in FIG. 4. Compared with other methods, the method implemented by PG-OMWS according to the present disclosure can obtain a lower average completion time. With the increase of the number of cores of the CPU of the mobile devices, the average completion time gradually decreases. The reason is that with the increase of the number of cores of the CPU of the mobile devices, the processing speed of nodes is greatly accelerated, thus shortening the average completion time.

Figure 5:
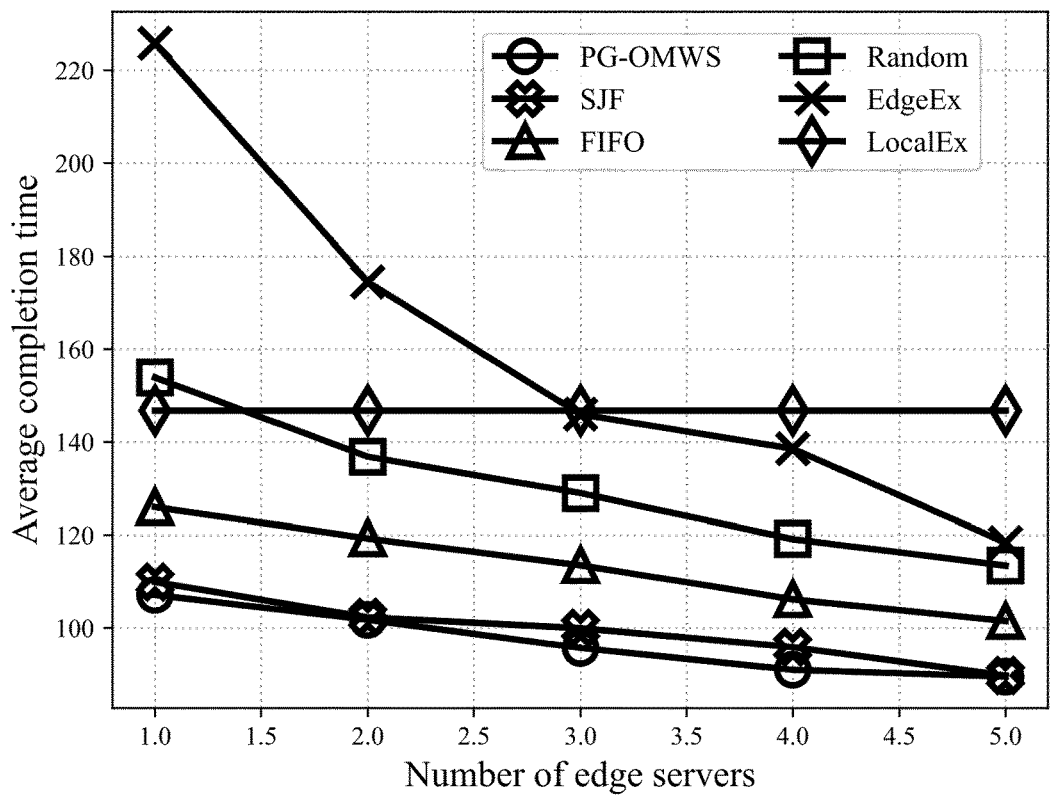
FIG. 5 is a comparison diagram of experimental results of the present disclosure with FIFO method, SJF method, Random method, LocalEx method and EdgeEx method under the influence of the number of the edge servers.

In order to study the influence of different number of edge servers on the performance of the method, the number of edge servers is set to 1 to 5 in increments of 1. The average completion time obtained by six methods is shown in FIG. 5. The result of FIG. 5 shows that the method implemented by PG-OMWS according to the present disclosure is always superior to other methods in the case that the number of edge servers varies. The average completion time decreases with the increase of the number of edge servers. The reason is that more edge servers provide more computing resources, thus reducing the average completion time. In addition, the curve of the LocalEx method is flat, since the LocalEx method executes all nodes locally, regardless of the number of edge servers.

Figure 6:
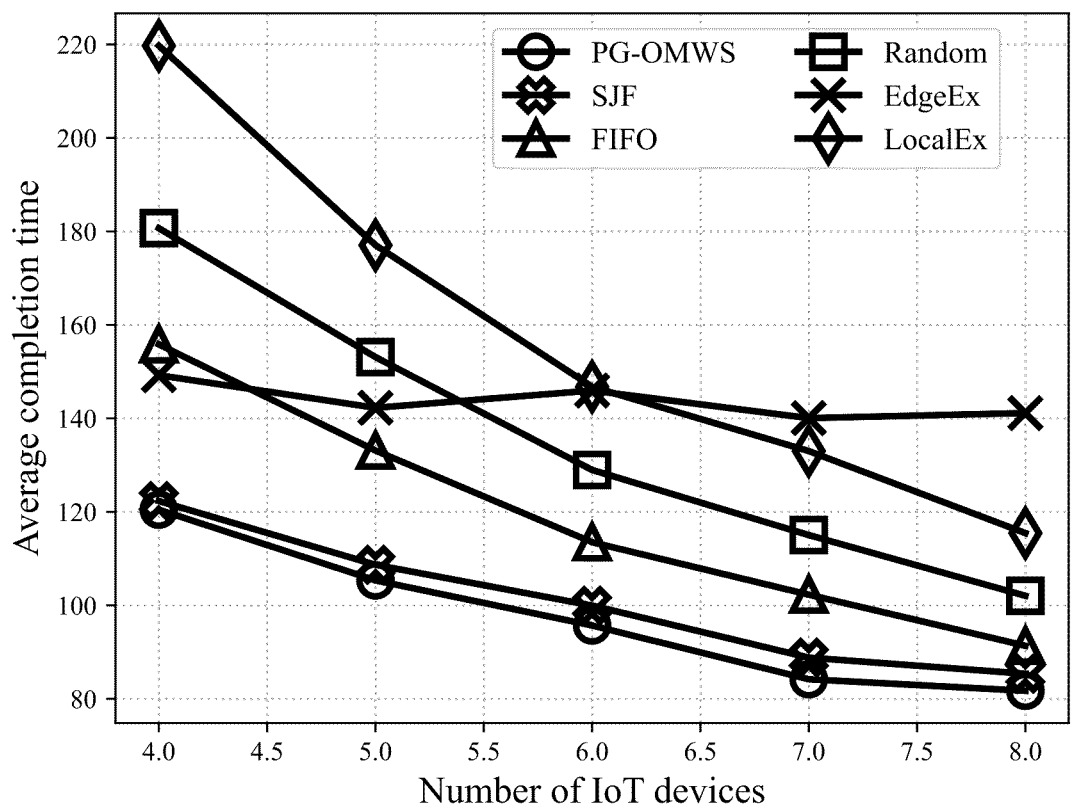
FIG. 6 is a comparison diagram of experimental results of the present disclosure with FIFO method, SJF method, Random method, LocalEx method and EdgeEx method under the influence of the number of the mobile devices.

In order to study the influence of the number of mobile devices on performance, experiments are carried out based on different numbers of mobile devices. The number of edge servers is set to 4 to 8 in increments of 1. The related results are shown in FIG. 6. It can be seen from FIG. 6 that the method implemented by PG-OMWS according to the present disclosure is always superior to other methods in the case that the number of mobile devices varies. With the increase of the number of mobile devices, the average completion time gradually decreases. The reason is that more mobile devices provide more computing resources, thus shortening the average completion time. In addition, when the number of mobile devices increases excessively, the EdgeEx method will not continue to decrease accordingly, since the EdgeEx method unloads most nodes to the edge server, regardless of the number of mobile devices.

What is claimed is:

1. An online multi-workflow scheduling method based on reinforcement learning, comprising:
    S1, establishing a mobile edge computing network,
    wherein the mobile edge computing network comprises a plurality of mobile devices and a plurality of edge servers, a processor frequency and a number of processor cores of the mobile devices are respectively represented as $f_n$ and $cpu_n$, a processor frequency and a number of processor cores of the edge servers are respectively represented as $f_m$ and $cpu_m$, and a bandwidth between the edge servers and a bandwidth between the mobile devices and the edge servers are both represented as B;
    independent tasks generated online by each mobile device are characterized by a Directed Acyclic Graph (DAG), and then each Directed Acyclic Graph (DAG) is represented as a 2-tuple G=(V, E), wherein V=($v_1, \ldots, v_k, \ldots, v_K$) represents nodes in the DAG, and E={$e_{kl}|v_k \in V, v_l \in V$} represents an edge that characterizes a connection relationship between the nodes, and the edge $e_{kl}$ represents a constraint dependency relationship between the nodes, and the constraint dependency relationship indicates that the node $v_l$ starts execution only after the node $v_k$ completes execution; and
    each node is characterized as a triple $v_k=(W_k, D_k^i, D_k^o)$, wherein $W_k$ represents a workload of the node $v_k$, $D_k^i$ represents an input data size of the node $v_k$, and $D_k^o$ represents an output data size of the node $v_k$;
    S2,
    after a scheduling action is triggered, selecting, by a scheduling policy, a node to be allocated and determining the edge server or mobile device to which the node is to be allocated;
    S3, establishing a timeline model,
    wherein the timeline model records arrival events of all DAG tasks and execution completion events of the nodes; and
    wherein the arrival events of the task on the mobile device obey Poisson distribution with a parameter $\lambda$, wherein a task arrival rate is $\lambda$, an event closest to a current time on the timeline is continuously captured, the current time is updated according to the captured event until a condition for triggering the scheduling action is met; after the scheduling action is completed, the events on the timeline continue to be captured;
    S4, establishing an online multi-workflow scheduling policy based on reinforcement learning, wherein the online multi-workflow scheduling policy comprises a state space, an action space and a reward function of a scheduling problem;

S41, defining the state space:
wherein the state space comprises environment states $O_{node}$ and $O_{server}$ obtained by an agent observing environment:

when selecting the node to be scheduled, the environment state $O_{node}$ observed by the agent is expressed as Formula (5):

$$O_{node}=[E_{node},E_{DAG},E_{globa},T_{stay},T_{waste},D_{i,o},W_{node},W_{pre}] \quad (5)$$

wherein $E_{node}$, $E_{DAG}$, and $E_{globa}$ represent an embedding vector of the node, an embedding vector of the DAG to which the node belongs, and a global embedding vector, respectively; $T_{stay}$ represents a staying time of the DAG to which the node belongs in the environment; $T_{waste}$ represents a duration that the node will wait for execution on the mobile device or the edge server and that the mobile device or the edge server will wait; $D_{i,o}$ represents input and output data of the node; and $W_{node}$ represents the workload of the node; $W_{pre}$ represents a sum of the workloads of all parent nodes of the node; and when selecting a server to be allocated, the environment state $O_{server}$ observed by the agent is expressed as Formula (6):

$$O_{server}=[st_{pre},st_{server},T_{exec},num_{child},W_{child}] \quad (6)$$

wherein $st_{pre}$ represents a time when data transmission of predecessor nodes of the node is completed; $st_{server}$ represents an available time of each server; $T_{exec}$ represents an execution time of the node on each server; $num_{child}$ represents a total number of all child nodes and all descendant nodes of the node; and $W_{child}$ represents a sum of the workloads of all the child nodes and all the descendant nodes of the node;

S42, inputting, by the agent, the environment states $O_{node}$ and $O_{server}$ into two neural networks based on the gradient policy, respectively, to select the node node to be scheduled this time from the nodes to be scheduled and select the server server to be allocated to the node from the available servers, so as to obtain which is expressed by Formula (7):

$$A=[node, server] \quad (7)$$

wherein A represents the action space;

S43, defining the reward function
as an existence time R of all DAG tasks in the environment during a period from the start of a current action to the trigger of a next action, which is expressed by Formulas (8) and (9):

$$R=-\Sigma T_{stay}(G) \quad (8)$$

$$T_{stay}(G)=\min(T_{now},T_{finish}(G))-\max(T_{pre},T_{arrive}(G)) \quad (9)$$

wherein $T_{now}$ represents the current time; $T_{finish}(G)$ represents a completion time of a workflow G; $T_{pre}$ represents a time when a last action is executed; $T_{arrive}(G)$ represents an arrival time of the workflow G; $\min(T_{now}, T_{finish}(G))$ represents a minimum value of $T_{now}$ and $T_{finish}(G)$; and $\max(T_{pre}, T_{arrive}(G))$ represents a maximum value of $T_{pre}$ and $T_{arrive}(G)$;

S44, maximizing
a cumulative reward of all actions by the two neural networks based on the gradient policy, which is expressed by Formula (10):

$$\text{Maximize: } \Sigma_{k=0}^{T}R_k \quad (10)$$

wherein T indicates T actions in implementation of the gradient policy, k indicates a k-th action, and $R_k$ indicates a reward of the k-th action; and
performing gradient ascent on neural network parameters to learn the parameters;

S5, implementing the online multi-workflow scheduling policy, which comprises:
initializing environmental parameters and network parameters; observing, by the agent, basic features of each node in the environment, and feeding the basic features to a graph convolution neural network for two aggregations to obtain $E_{node}$, and then performing the aggregation to obtain $E_{DAG}$ according to these $E_{node}$, and performing the aggregation to obtain $E_{globa}$ according to all $E_{DAG}$, to obtain $O_{node}$ and $O_{server}$ in conjunction with the current environment; selecting the node to be scheduled for the action and the server to be allocated to the node, recording the completion events of the node in the timeline, and calculating the reward of the action at a same time; and saving the environmental state, the action and the reward observed every time;
subsequently, determining whether the condition for triggering the scheduling action is met, if the condition is met, continuously triggering the scheduling action, and if the condition is not met, capturing the event closest to the current time on the timeline, and updating the current time according to the event, until the condition for triggering the scheduling action is met again; and
continuously repeating a cycle of scheduling action and capturing timeline events until all DAG tasks in the environment complete execution;
according to the environment states, the action and the reward saved previously, using, by the agent, the gradient policy to update each network parameter by Formula (11) to obtain a final workflow scheduling policy:

$$\theta \leftarrow \theta + \alpha \Sigma_{k=0}^{T}\nabla_\theta \ln \pi_\theta(o_k,a_k)r_k \quad (11)$$

wherein θ represents the network parameter, a represents a learning rate, T represents T actions in the implementation of the gradient policy, k represents the k-th action, $\pi_\theta(o_k, a_k)$ represents a probability that the neural network with θ as the parameter takes the action $a_k$ in the environmental state $o_k$, $r_k$ represents a comprehensive reward obtained by further attenuation based on the immediate reward R, $\nabla_\theta \ln \pi_\theta(o_k, a_k)r_k$ represents a gradient of $\ln \pi_\theta(s_k, a_k)r_k$, and $\Sigma_{k=0}^{T}\nabla_\theta \ln \pi_\theta(o_k, a_k)r_k$ represents an accumulation of the gradients obtained from all actions; and
when a workflow dynamically arrives in the environment, selecting, by the final workflow scheduling policy, the edge server or the mobile device that executes the node in the workflow as the server that executes the node to execute and complete the nodes in the workflows in sequence.

* * * * *